United States Patent
Ruffini et al.

(10) Patent No.: US 10,148,539 B2
(45) Date of Patent: Dec. 4, 2018

(54) USE OF COMMON PUBLIC RADIO INTERFACE OVER ASYMMETRIC NETWORKS

(71) Applicant: Telefonaktiebolaget L M Ericsson (publ), Stockholm (DE)

(72) Inventors: Stefano Ruffini, Rome (IT); Bjorn Pohlman, Jarfalla (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 238 days.

(21) Appl. No.: 14/425,771

(22) PCT Filed: Sep. 24, 2012

(86) PCT No.: PCT/EP2012/068774
§ 371 (c)(1),
(2) Date: Mar. 4, 2015

(87) PCT Pub. No.: WO2014/037061
PCT Pub. Date: Mar. 13, 2014

(65) Prior Publication Data
US 2015/0207714 A1    Jul. 23, 2015

(30) Foreign Application Priority Data
Sep. 6, 2012 (EP) .................... 12183318

(51) Int. Cl.
*H04L 12/26* (2006.01)
*H04J 3/06* (2006.01)
*H04J 3/16* (2006.01)

(52) U.S. Cl.
CPC .......... *H04L 43/0864* (2013.01); *H04J 3/065* (2013.01); *H04J 3/0682* (2013.01); *H04J 3/1652* (2013.01); *H04J 2203/0082* (2013.01)

(58) Field of Classification Search
None
See application file for complete search history.

(56) References Cited

U.S. PATENT DOCUMENTS

2008/0225816 A1* 9/2008 Osterling .............. H04J 3/0682
370/342
2009/0245228 A1* 10/2009 Osterling .............. H04J 3/0638
370/350

(Continued)

FOREIGN PATENT DOCUMENTS

| CN | 1852049 A | 10/2006 |
|----|-----------|---------|
| CN | 101043277 A | 9/2007 |

(Continued)

OTHER PUBLICATIONS

PCT International Search Report, dated May 14, 2013, in connection with International Application No. PCT/EP2012/068774, all pages.

(Continued)

Primary Examiner — Peter Chau
(74) Attorney, Agent, or Firm — Leffler Intellectual Property Law, PLLC

(57) ABSTRACT

Communication between a Radio Equipment Control (REC) and a Radio Equipment (RE) in a wireless network uses a Common Public Radio Interface connection. When the Radio Equipment Control and the Radio Equipment are located remote from each other, and are connected by an asymmetric transport network, such as an Optical Transport Network, path delay data is transmitted in the Common Public Radio Interface data frames. This allows the CPRI end nodes to correct for path delay asymmetry using the path delay data.

9 Claims, 6 Drawing Sheets

(56) References Cited

U.S. PATENT DOCUMENTS

| | | | |
|---|---|---|---|
| 2010/0246487 A1* | 9/2010 | Aoyama | H04W 56/00 370/328 |
| 2011/0014908 A1* | 1/2011 | Eiza | H04W 56/0045 455/423 |
| 2011/0032910 A1* | 2/2011 | Aarflot | H04J 3/0682 370/335 |
| 2011/0143813 A1* | 6/2011 | Ohashi | H04W 88/08 455/561 |
| 2011/0228831 A1* | 9/2011 | Hirata | H04J 3/0682 375/224 |
| 2012/0170631 A1 | 7/2012 | Liu | |
| 2012/0287843 A1* | 11/2012 | Watanabe | H04B 7/155 370/315 |
| 2012/0307712 A1* | 12/2012 | Watanabe | H04B 7/2606 370/315 |
| 2013/0129353 A1* | 5/2013 | Tan | H04B 10/25759 398/66 |
| 2013/0266323 A1* | 10/2013 | Tan | H04J 3/0682 398/115 |
| 2014/0029586 A1* | 1/2014 | Loehr | H04W 56/0005 370/336 |

FOREIGN PATENT DOCUMENTS

| | | |
|---|---|---|
| CN | 102082697 A | 6/2011 |
| EP | 2 276 298 A1 | 1/2011 |
| EP | 2 408 128 A1 | 1/2012 |
| EP | 2 437 416 A2 | 4/2012 |
| EP | 2 448 168 A1 | 5/2012 |
| RU | 2133489 C1 | 7/1999 |
| RU | 2356080 C1 | 5/2009 |
| WO | 2009049207 A2 | 4/2009 |
| WO | 2009067072 A1 | 5/2009 |
| WO | 2012/048975 A1 | 4/2012 |
| WO | 2012048975 A1 | 4/2012 |
| WO | 2012092903 A2 | 7/2012 |
| WO | WO 2012092903 A2 * | 7/2012 ............ H04J 3/0682 |
| WO | 2012/110109 A2 | 8/2012 |
| WO | 2013174454 A1 | 11/2013 |
| WO | 2014029430 A1 | 2/2014 |

OTHER PUBLICATIONS

Ericsson "Discussion on CPRI over OTN Sync Requirements" ITU-T Draft, vol. 13, Sep. 21, 2010, pp. 1-6, XP017448601.
CPRI Specification V5.0 "Common Public Radio Interface (CPRI); Interface Specification", Sep. 21, 2011, pp. 1-119.
IEEE Standard 1588-2008 "IEEE Standard for a Precision Clock Synchronization Protocol for Network Measurement and Control Systems" Jul. 24, 2008, pp. 1-289.
ITU-T Standard G.709N.1331 "Interfaces for the Optical Transport Network" Feb. 2012, pp. 1-232.
PCT International Search Report, dated May 29, 2013, in connection with International Application No. PCT/EP2012/066343, all pages.
Cohen , R. "PTP over MPLP draft-ronc-ptp-mpls-00.txt", Jun. 30, 2007, The IETF Trust, XP015052119, Issn: 0000-0004, pp. 1-14.
Katz, D. et al. "Traffic Engineering (TE) Extensions to OSPF Version 2" Network Working Group RFC 3630, Sep. 2003, The Internet Society, pp. 1-14.
ITU-T Recommendation G.709/Y.1331 "Interfaces for the optical transport network" ITU-T, Feb. 2012, pp. 1-238.
ITU-T Recommendation G.8271/Y.1366 "Time and phase synchronization aspects of packet networks", Feb. 2012, Appendix 1.6, pp. 1-5, 20-23.
Braden, R. et al. "Resource ReSerVation Protocol (RSVP)—Version 1 Functional Specification" Network Working Group RFC 2205, Sep. 1997, pp. 1-97.
Chinese Office Action, dated Mar. 27, 2017, in connection with Chinese Application No. 201280076562.3, all pages.
English language translation of Chinese Office Action, dated Mar. 27, 2017, in connection with Chinese Application No. 201280076562.3, all pages.
English language translation of Chinese Search Report dated Mar. 27, 2017, in connection with Chinese Application No. 201280076562.3, all pages.
S. Davari et al., Transporting PTP messages (1588) over MPLS Networks, Sep. 22, 2010, 12 pages.
Chongning Na et al., Synchronization Performance of the Precision Time Protocol, 2007 International IEEE Symposium on Precision Clock Synchronization (ISPCS) for Measurement, Control and Communication, Vienna, Austria, Oct. 1-3, 2007, 8 pages.
Junfang Wang et al., 1588v2 transmission by OSC over OTN, FH Corporation.CATR.ATE Corporation, Shenzhen, Oct. 18-22, 2010, 3 pages.
IEEE Standard for a Precision Clock Synchronization Protocol for Networked Measurement and Control Systems, IEEE Instrumentation and Measurement Society, XP-002588173, IEEE Std 1588-2008, Jul. 24, 2008, part 1 pp. 1-144.
IEEE Standard for a Precision Clock Synchronization Protocol for Networked Measurement and Control Systems, IEEE Instrumentation and Measurement Society, XP-002588173, IEEE Std 1588-2008, Jul. 24, 2008, part 2 pp. 145-287.
ITU-T Recommendation G.709/Y.1331, Interfaces for the Optical Transport Network (OTN), ITU-T, Dec. 2009, 218 pages.
ITU, Telecommunication Standardization Sector, COM 15-C 1451-E, Analysis of phase/time distribution over OTN networks, France Telecom, Feb. 2011, 6 pages.
Chinese Search Report, dated Mar. 22, 2017, in connection with Chinese Application No. 2012800769111, all pages.
English translation of Chinese Office Action, dated Apr. 1, 2017, in connection with Chinese Application No. 2012800769111, all pages.
English translation of Chinese Office Action Summary, dated Apr. 1, 2017, in connection with Chinese Application No. 2012800769111, all pages.

* cited by examiner

USE OF COMMON PUBLIC RADIO INTERFACE OVER ASYMMETRIC NETWORKS

CROSS-REFERENCE TO RELATED APPLICATIONS

This application claims priority under 35 U.S.C. § 119 to European Patent Application No. EP12183318.0, filed Sep. 6, 2012, which is hereby incorporated herein by reference in its entirety.

TECHNICAL FIELD

This invention relates to a radio access architecture, and in particular to a radio access architecture using the Common Public Radio Interface. More specifically, the invention relates to the use of the Common Public Radio Interface over a transmission medium in which a downlink delay and an uplink delay cannot be guaranteed to be equal.

BACKGROUND

It is known that, in a Radio Access Network (RAN), such as a Universal Mobile Telecommunications System (UMTS) RAN, the radio base station has two basic subsystems, namely the Radio Equipment Control (REC) and the Radio Equipment (RE). The Common Public Radio Interface (CPRI) defines a specification for the internal interface of radio base stations between the Radio Equipment Control (REC) and the Radio Equipment (RE).

In some circumstances, the particular Radio Access Network might require that the nodes of the network should be synchronized, to within a specified time. In such a case, it will often be necessary to calibrate for the delay introduced by the link between the nodes, in particular when the Radio Equipment Control and the Radio Equipment are not co-located.

In many implementations, the link between the Radio Equipment Control (REC) and the Radio Equipment (RE) uses a point-to-point optical fibre connection. In that case, it can be assumed, with an acceptable degree of accuracy, that the connection is symmetric, that is, that the uplink delay is equal to the downlink delay. The round-trip delay, that is, the time taken for a signal to pass from a first node to a second node, and then back to the first node, can be measured accurately. Therefore, if it can be assumed that the uplink delay is equal to the downlink delay, the one way delay can be estimated from the round trip delay with acceptable accuracy.

However, when the link uses an asymmetric connection, in which the uplink delay is not necessarily equal to the downlink delay, the one way delay cannot be estimated from the round trip delay with the degree of accuracy that is required.

SUMMARY

It is an object to provide a method of allowing the Common Public Radio Interface over an asymmetric transmission medium, in which a downlink delay and an uplink delay cannot be guaranteed to be equal.

According to one aspect, there is provided a method of communicating in a wireless network. The method comprises, in a node of the network, receiving data over a Common Public Radio Interface connection, extracting path delay data from the Common Public Radio Interface data frames, and correcting for path delay asymmetry using said path delay data.

The Common Public Radio Interface connection may be over an asymmetric transport network, with the path delay data relating to the asymmetric transport network, and the asymmetric transport network may be an Optical Transport Network.

In an embodiment, the path delay data is received within control words of the Common Public Radio Interface data frames. For example, the path delay data may be received within control words 8-15, 72-79, 136-143 and 200-207 of a hyperframe of the Common Public Radio Interface data structure, or may be received within control words $16\text{-}(p-1)$, $80\text{-}(p+63)$, $144\text{-}(p+127)$ and $208\text{-}(p+191)$ of a hyperframe of the Common Public Radio Interface data structure, where p is the index of a start of Control & Management data.

In one embodiment, the path delay data comprises data relating to a difference in a first transit time from the first node to the second node and a second transit time from the second node to the first node. In another embodiment, the path delay data comprises data relating to the first transit time and data relating to the second transit time.

In some embodiments, the path delay data comprises data directly representing a time value, for example a value equal to said time value in nanoseconds multiplied by a predetermined multiplier.

According to another aspect, there is provided a method of communicating in a wireless network, comprising, in a Common Public Radio Interface connection between two nodes of the network, transmitting path delay data from a first node to a second node within Common Public Radio Interface data frames.

According to another aspect, there is provided a Common Public Radio Interface node, comprising: a mapper, for receiving payload and control data, and for receiving path delay data, and for forming Common Public Radio Interface data frames from said data; and a transmitter, for transmitting said Common Public Radio Interface data frames.

According to another aspect, there is provided a Common Public Radio Interface node, comprising: a receiver, for receiving Common Public Radio Interface data frames; and a demapper, for extracting path delay data from said Common Public Radio Interface data frames.

DETAILED DESCRIPTION

Figure 1:
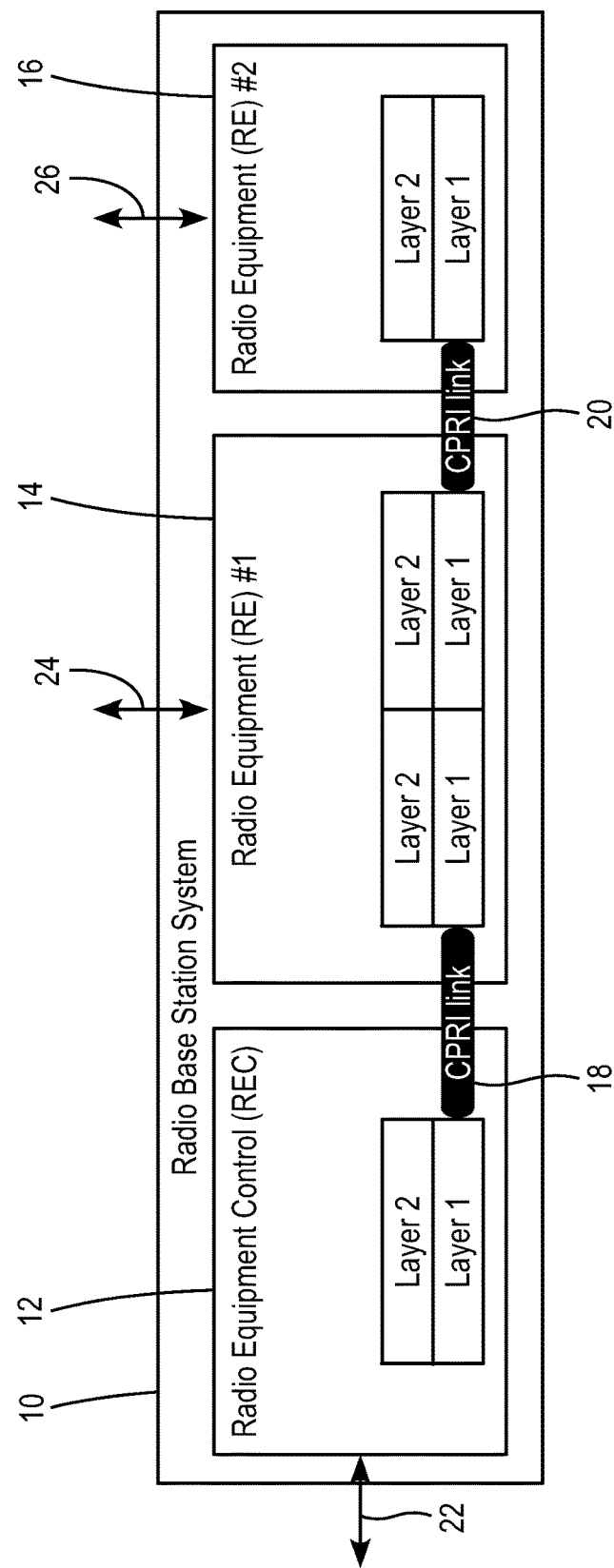
FIG. 1 shows a system architecture, illustrating a use of the Common Public Radio Interface.

FIG. 1 shows a system architecture of a Radio Base Station System 10, which is divided into two basic subsystems, namely the Radio Equipment Control (REC) and the Radio Equipment (RE). As is known, the REC contains the radio functions of the digital baseband domain, whereas the RE contains the analogue radio frequency functions. It will be appreciated that there are many system architectures and topologies in which an interface in accordance with the Common Public Radio Interface (CPRI) specification can be used. However, in the example system architecture shown in FIG. 1, there is a single Radio Equipment Control (REC) 12, connected to a first Radio Equipment (RE) 14 and a second Radio Equipment (RE) 16. The Radio Equipment Control (REC) 12 is connected to the first Radio Equipment (RE) 14 by means of a first CPRI link 18, with the Radio Equipment Control (REC) 12 acting as the Master and the first Radio Equipment (RE) 14 acting as the Slave. The first Radio Equipment (RE) 14 is connected to the second Radio Equipment (RE) 16 by means of a second CPRI link 20, with the first Radio Equipment (RE) 14 acting as the Master and the second Radio Equipment (RE) 16 acting as the Slave.

The Radio Equipment Control (REC) 12 has a network interface 22 for connection to the core network. For example, in the case of a UMTS radio access network, the REC provides access to the Radio Network Controller via the Iub interface. In the case of a WiMAX network, the REC provides access to other network entities, such as other base stations, or the Access Service Network (ASN) Gateway. In the case of an Extended UMTS Radio Access (E-UTRA) network, the REC provides access to the Evolved Packet Core for the transport of user plane and control plane traffic via an S1 interface.

The Radio Equipments 14, 16 provide the air interfaces 24, 26 to the user equipment or mobile subscriber stations, for example over the Uu interface in the case of a UMTS radio access network.

In the Radio Equipment Control (REC) 12, and the Radio Equipments (RE) 14, 16, the physical layer (layer 1) typically supports at least an electrical interface and an optical interface, while layer 2 supports flexibility and scalability. As is conventional, User Plane data, Control and Management Plane data, and Synchronization Plane data are multiplexed over the CPRI link.

Figure 2:
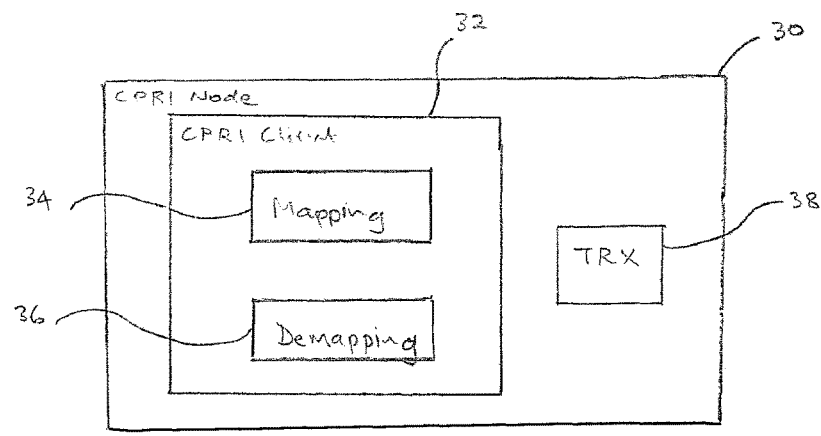
FIG. 2 shows a form of a node in the system of FIG. 1.

FIG. 2 illustrates schematically the form of the CPRI node in either the Radio Equipment Control (REC) or the Radio Equipments (RE). Specifically, the CPRI node 30 contains a CPRI client 32, which includes a mapping block 34, for putting the required data into the format defined by the CPRI specification, and a demapping block 36, for extracting data from data received in the format defined by the CPRI specification. In addition, the CPRI node 30 contains a transceiver block 38, for transmitting and receiving data over the relevant interface.

Figure 3:
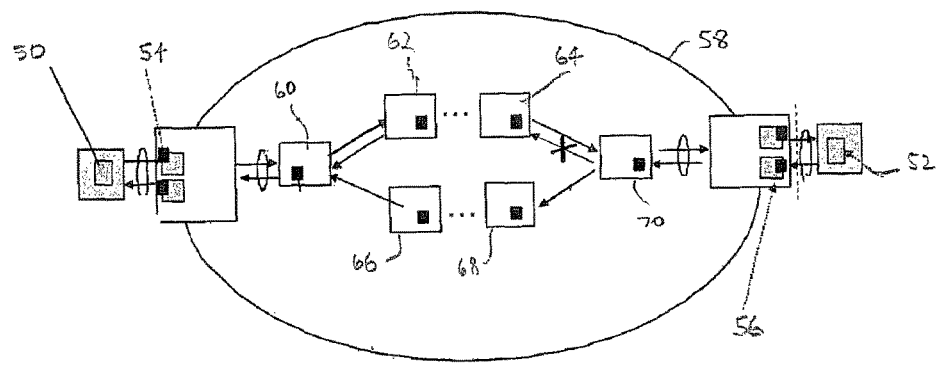
FIG. 3 shows a Common Public Radio Interface connection over an asymmetric network.

FIG. 3 illustrates a radio base station system in accordance with an embodiment. In this illustrated embodiment, the Radio Equipment Control (REC) 50 (also known as the Digital Unit (DU)) is located remotely from the Radio Equipment (RE) 52 (also known as the Radio Unit (RU)). The REC 50 is associated with a first CPRI client OTN mapper node 54, which performs mapping and demapping as described above, amongst other functions. Similarly, the RE 52 is associated with a second CPRI client OTN mapper node 56, which performs mapping and demapping as described above.

As noted above, the REC 50 is located remotely from the RE 52, and they are connected over a server network 58. In this illustrated example, the server network is an Optical Transport Network (OTN), including multiple nodes, of which some nodes 60, 62, 64, 66, 68, 70 are illustrated. The mapping of CPRI over OTN has been defined in the recommendation ITU-T G.709.

The CPRI specification places certain requirements on the link between the REC and RE nodes. For example, the CPRI specification shall guarantee that the frequency synchronization on the radio interfaces should be better than 50 parts per billion, as required by many mobile technologies, and therefore only limited noise can be introduced by the CPRI link itself. Other mobile features and technologies, such as Long Term Evolution Time Division Duplex (LTE-TDD) require phase alignment over the radio interface. This in turn means that the REC and RE nodes should be able to calibrate for any delay on the link between them. For example, the calibration for delay over the transport network should be performed to within a few tens of nanoseconds (for example within 16 ns).

In some situations, the transport network between the REC and the RE is symmetric within a tolerance of a few nanoseconds. That is, the delay associated with the transmission from the REC to the RE is equal to the delay associated with the transmission from the RE to the REC. In such situations, the link delay calibration can be performed by calculating the round trip delay from the REC to the RE and back to the REC, or from the RE to the REC and back to the RE. The link delay is then half of the round trip delay.

However, in the system shown in FIG. 3, where an OTN network is used as the transport network, it cannot be assumed that the transport network is symmetric. That is, OTN networks may introduce different delays in the forward (downlink) and reverse (uplink) transmission. The asymmetry can arise due to different fiber link lengths in the forward and reverse directions, the use of different wavelengths, and/or different delays added by the various buffers (for example for used in Forward Error Correction, mapping, etc.) in the forward and reverse directions.

Although the invention is described herein with reference to a specific asymmetric network in the form of an Optical Transport Network, it will be appreciated that CPRI links could equally be established over other asymmetric networks, including wireless networks.

As discussed in more detail below, the problem of calibrating for delays in asymmetric transport networks such as OTN is mitigated by enhancing the CPRI specification to carry information on the downlink and uplink transit time. This information can then be used by the CPRI system to compensate for the asymmetry introduced by the transport network before calibrating for link delay.

Figure 4:
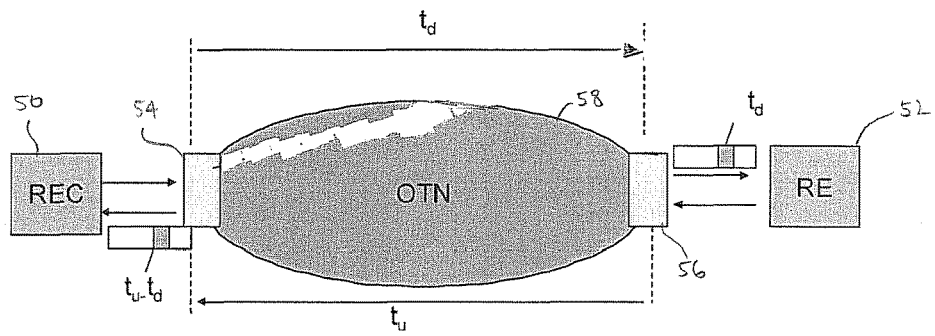
FIG. 4 illustrates the asymmetry correction in the situation illustrated in FIG. 3.

FIG. 4 illustrates the radio base station system of FIG. 3, operating in accordance with one embodiment. The REC 50 is associated with a first CPRI client 54 OTN mapper node, while the RE 52 is associated with a second CPRI client 56 OTN mapper node, and the REC 50 and the RE 52 are connected over an Optical Transport Network 58.

In this embodiment, the CPRI client OTN mapper nodes 54, 56 have access to a common source of time information. For example, the CPRI client OTN mapper nodes 54, 56 might have access to respective Global Positioning System (GPS) receivers at their respective locations, allowing them to access highly accurate time information. This time information can be transmitted from the REC 50 to the RE 52, and from the RE 52 to the REC 50. As another example, if the OTN supports the Precision Time Protocol defined by IEEE 1588, then this can be used to provide a common source of time information between the nodes.

Thus, as shown in FIG. 4, where the downlink transit time from the REC 50 to the RE 52 is denoted by $t_d$, and the uplink transit time from the RE 52 to the REC 50 is denoted by $t_u$, the CPRI client OTN mapper node 56 is able to deduce the downlink transit time by comparing the time of transmission from the REC 50 with the time of reception at the RE 52. Similarly, the CPRI client OTN mapper node 54 is able to deduce the uplink transit time by comparing the time of transmission from the RE 52 with the time of reception at the REC 50. If the RE 52 also notifies the REC 50 of the downlink transit time, and the REC 50 notifies the RE 52 of the uplink transit time, then each CPRI end node is able to deduce the asymmetry $(t_u - t_d)$, that is, the difference between the uplink transit time and the downlink transit time.

Thus, the information about the transit times can be used to deduce information about the difference between the transit times, and this represents the path asymmetry.

Each CPRI end node can then make an appropriate correction for the asymmetry.

As an alternative, WO/2012/110109 describes a method of providing path delay asymmetry information, allowing time synchronization between a master clock at a first client node and a slave clock at a second client node. The method described therein can be used to generate path delay data, which can then be exchanged between the REC 50 and RE 52, as described in more detail below.

There are further alternative methods for generating the path delay data. For example, each node in the link can add information on the related transit time.

Figure 5:
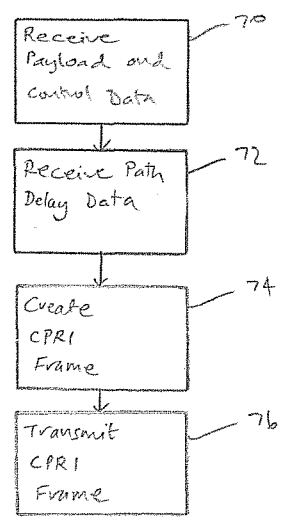
FIG. 5 is a flow chart, illustrating a first method performed in a node with a Common Public Radio Interface connection.

FIG. 5 is a flow chart illustrating a first method, performed in a node (which may be a REC or a RE). In step 70, the node receives payload and control data to be transmitted to another node. In step 72, the node obtains path delay data, for example by any of the methods described above.

In step 74, the node creates a CPRI frame, for example in the mapping block, including the path delay data, as described in more detail below. In step 76, the node transmits the CPRI frame to the other node.

Figure 6:
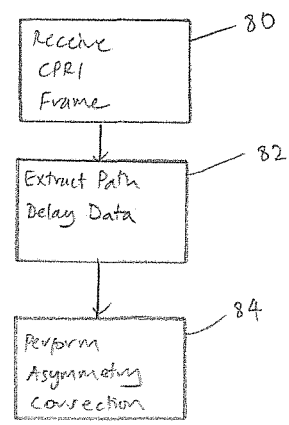
FIG. 6 is a flow chart, illustrating a second method performed in a node with a Common Public Radio Interface connection.

FIG. 6 is a flow chart illustrating a second method, performed in the other node described with reference to FIG. 5 (which again may be a REC or a RE).

In step 80, the node receives a CPRI frame. In step 82, the node extracts the path delay data from the CPRI frame, for example in the demapping block.

In step 84, the node uses the extracted path delay data to perform an asymmetry calculation, in order to achieve the required synchronization between the nodes.

There are different ways in which the path delay data can be included in the CPRI frames.

Figure 7:
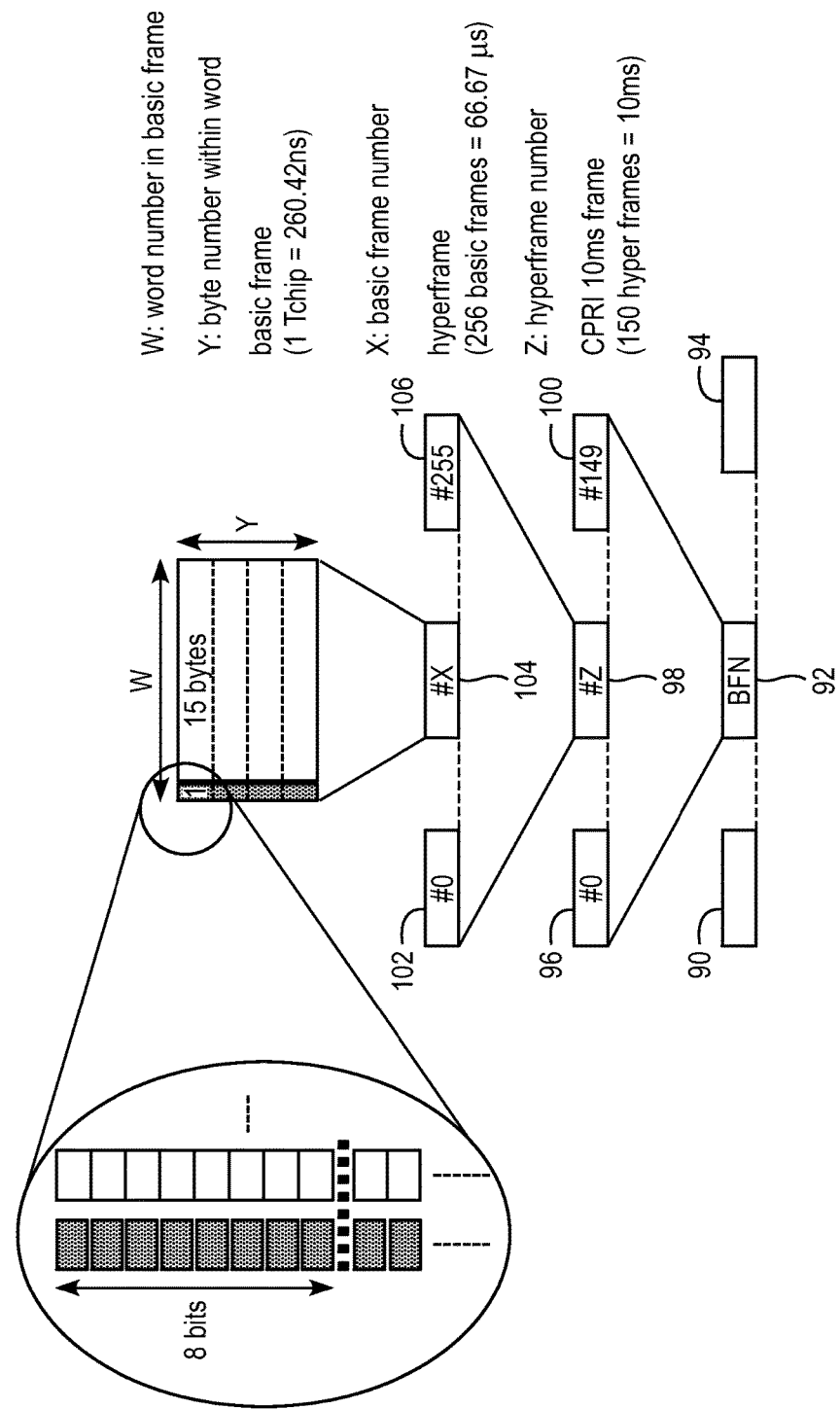
FIG. 7 illustrates a first aspect of the data structure in the Common Public Radio Interface specification.

FIG. 7 illustrates the CPRI frame structure. Time is divided into 10 millisecond radio frames 90, 92, 94, each identified by a Basic Frame Number (BFN). Each radio frame is divided into 150 hyperframes 96, 98, 100 numbered #0, . . . , #Z, . . . , #149. Each hyperframe is divided into 256 basic frames 102, 104, 106 numbered #0, . . . , #X, . . . , #255. Thus, the length of a basic frame is 260.416667 ns, which is equal to 1/3.84 MHz.

A basic frame consists of 16 words with index W=0, . . . , 15. The number of bytes in each word depends on the CPRI line bit rate. The CPRI specification mandates the use of an 8/10 coding scheme, in which 8-bit data symbols are mapped to 10-bit symbols for transmission.

Thus, the number of bytes, Y, in each word depends on the CPRI line bit rate as follows:

| CPRI line bit rate (Mbit/s) | Y |
| --- | --- |
| 614.4 | 1 |
| 1228.8 | 2 |
| 2457.6 | 4 |
| 3072.0 | 5 |
| 4915.2 | 8 |
| 6144.0 | 10 |
| 9830.4 | 16 |

Within each basic frame, one word, having the index W=0 (that is, 1/16 of the basic frame), is used as a control word.

Figure 8:
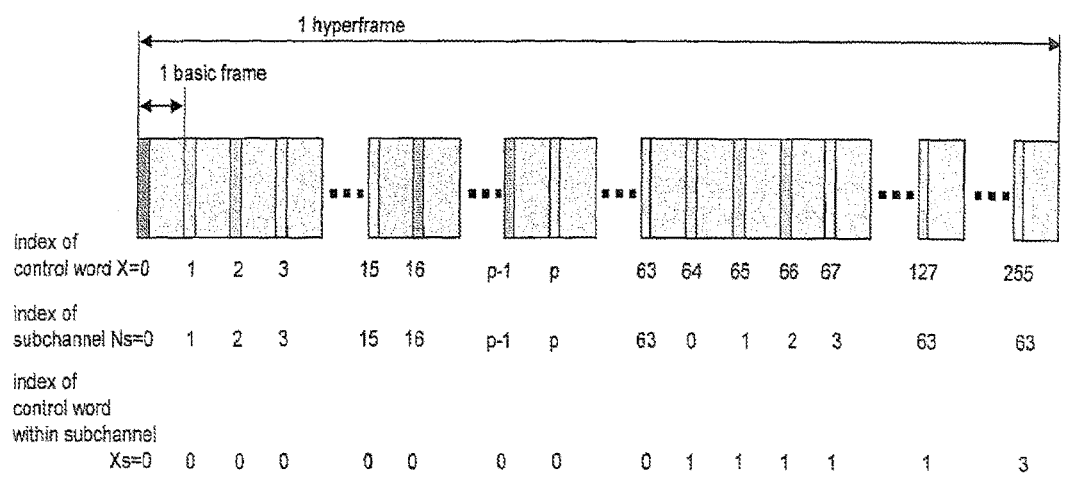
FIG. 8 illustrates a second aspect of the data structure in the Common Public Radio Interface specification.

FIG. 8 therefore shows the structure of one hyperframe, made up of 256 basic frames consisting of 16 words each, with one word in each basic frame being designated as a control word. The control words can be identified by an index X in the range from 0 to 255, corresponding to the index of the corresponding basic frame. Alternatively, the 256 basic frames can be divided into four subchannels identified by indices Xs in the range from 0 to 3, with the control words in each subchannel then being identified by the relevant index Xs and by indices Ns in the range from 0 to 63. Thus, X=Ns+64*Xs.

Figure 9:
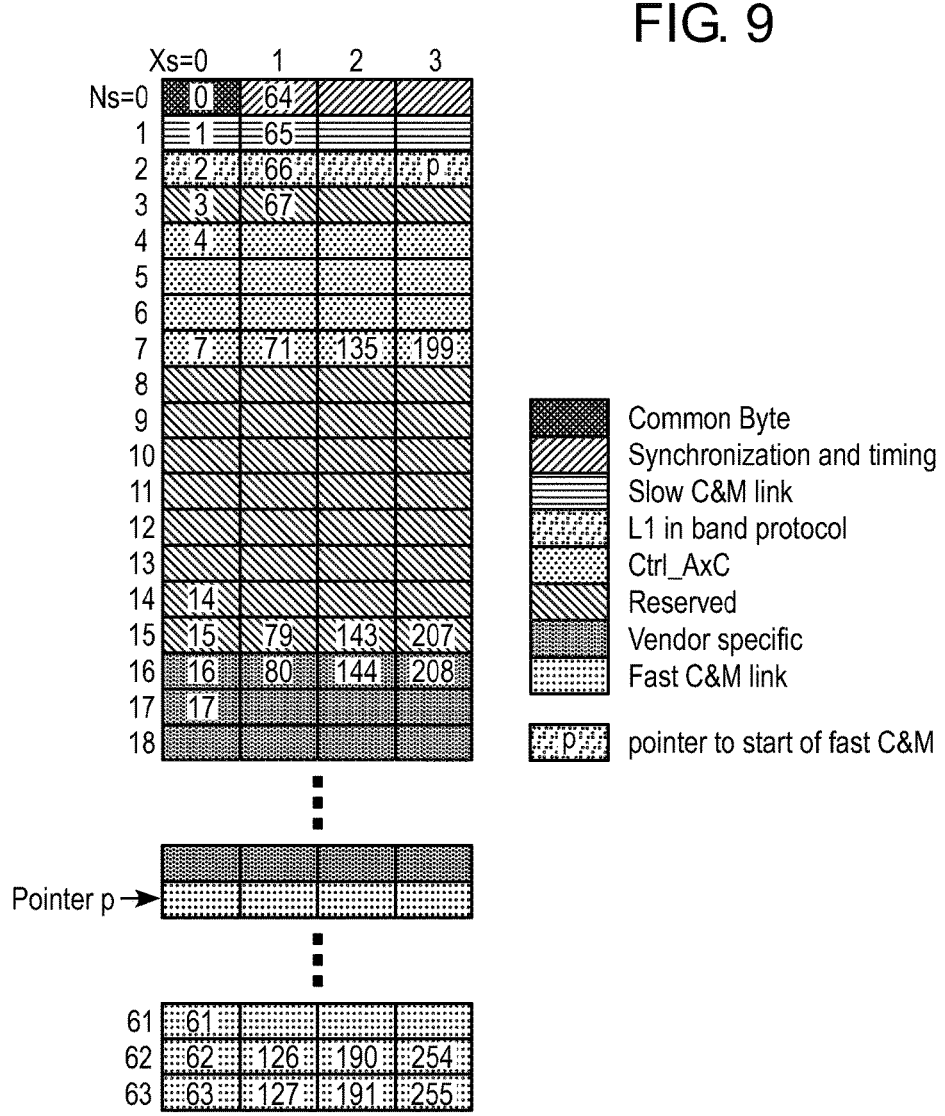
FIG. 9 illustrates a third aspect of the data structure in the Common Public Radio Interface specification.

FIG. 9 shows in more detail the information that can be transmitted in the control words of each hyperframe, according to the CPRI specification.

There are 36 control words of one hyperframe reserved for future interface protocol extensions, namely the control words identified by indices 3, 8-15, 67, 72-79, 131, 136-143, 195 and 200-207 of the hyperframe, and the path delay data can be included within these control words.

Alternatively, there are at least 16 control words of one hyperframe reserved for Vendor specific data, namely the control words identified by indices 16-(p−1), 80-(p+63), 144-(p+127) and 208-(p+191) of the hyperframe, where p is the index of a start of Control & Management data, and the path delay data can be included within these control words.

Thus, allocating 1 byte per hyperframe to the path delay data would allow the nodes to perform a delay calibration operation more frequently than once per millisecond, which should be sufficient in most cases. However, in principle correction could be associated with every delay measurement, for example 8 bytes per hyperframe.

As mentioned above, asymmetry is tolerated in the order of 20-40 ns.

The path delay data can be in a form that is consistent with popular implementations of IEEE 1588 correctionfield. More specifically, the IEEE1588 correctionfield is the value of the correction measured in nanoseconds and multiplied by $2^{16}$. For example, in this format 2.5 ns is represented as "$00000000000028000_{16}$".

This allows the time information to be provided with a precision in the nanosecond range, while also allowing a maximum value in the order of some hundreds of microseconds, which should be sufficient for most situations.

Thus, there is disclosed a method of communicating that allows CPRI to be transported over Optical Transport Networks, or other asymmetric networks, with minimal impact on the CPRI or OTN techniques.

The invention claimed is:

1. A method of communicating in a wireless network, the method comprising, in a second node of the wireless network:

receiving Common Public Radio Interface (CPRI) data frames over a CPRI connection from a first node of the wireless network;

extracting path delay data from the CPRI data frames in a CPRI data structure, wherein the path delay data comprises data representing a first transit time from the first node to the second node and data representing a second transit time from the second node to the first node, the first transit time being different from the second transit time, or the path delay data comprises data indicating a difference in the first transit time from the first node to the second node and the second transit time from the second node to the first node; and correcting for path delay asymmetry using said path delay data.

2. The method as claimed in claim 1, comprising receiving the path delay data over a CPRI connection over an asymmetric transport network, wherein said path delay data relates to said asymmetric transport network.

3. The method as claimed in claim 2, wherein the asymmetric transport network is an Optical Transport Network (OTN).

4. The method as claimed in claim 1, comprising extracting the path delay data from within control words 3, 8-15, 67, 72-79, 131, 136-143, 195 and 200-207 of a hyperframe of the CPRI data frames, or from within control words 16-($p$–1), 80-($p$+63), 144-($p$+127) and 208-($p$+191) of a hyperframe of the CPRI data frames, where p is an integer index of a start of Control & Management (C & M) data.

5. A method of communicating in a wireless network, the method comprising, in a Common Public Radio Interface (CPRI) connection between two nodes of the wireless network:

transmitting path delay data from a first node to a second node within CPRI data frames, wherein the path delay data comprises data representing a first transit time from the first node to the second node and data representing a second transit time from the second node to the first node, the first transit time being different from the second transit time, or the path delay data comprises data indicating a difference in the first transit time from the first node to the second node and the second transit time from the second node to the first node, and wherein the path delay data is used as a basis for correcting for path delay asymmetry.

6. A first Common Public Radio Interface (CPRI) node, comprising:

a mapping processing circuit, wherein the mapping processing circuit receives payload data, control data, and path delay data, and wherein the mapping processing circuit forms CPRI data frames in a CPRI data structure from said payload data, said control data, and said path delay data; and a transmitter configured to transmit said CPRI data frames to a second CPRI node, wherein the path delay data comprises data representing a first transit time from the first CPRI node to the second CPRI node and data representing a second transit time from the second CPRI node to the first CPRI node, the first transit time being different from the second transit time, or the path delay data comprises data indicating a difference in the first transit time from the first CPRI node to the second CPRI node and the second transit time from the second CPRI node to the first CPRI node, and wherein the path delay is for use as a basis for correcting for path delay asymmetry.

7. The first CPRI node as claimed in claim 6, wherein said path delay data relates to an asymmetric transport network over which said CPRI data frames are to be transmitted.

8. The first CPRI node as claimed in claim 6, wherein said mapping processing circuit includes said path delay data in control words 3, 8-15, 67, 72-79, 131, 136-143, 195 or 200-207 of a hyperframe of the CPRI data frames, or in control words 16-($p$–1), 80-($p$+63), 144-($p$+127) and 208-($p$+191) of a hyperframe of the CPRI data frames, where p is an integer index of a start of Control & Management (C & M) data.

9. A second Common Public Radio Interface (CPRI) node, comprising:

a receiver configured to receive CPRI data frames from a first CPRI node; and a demapping processing circuit, wherein the demapping processing circuit extracts path delay data from said CPRI data frames, wherein the path delay data comprises data representing a first transit time from said first CPRI node to the second CPRI node and data representing a second transit time from the second CPRI node to said first CPRI node, the first transit time being different from the second transit time, or the path delay data comprises data indicating a difference in the first transit time from the first CPRI node to the second CPRI node and the second transit time from the second CPRI node to the first Public Radio Interface node, wherein the second CPRI node corrects for path delay asymmetry using said path delay data.

* * * * *